(12) United States Patent
Horns

(10) Patent No.: US 8,943,431 B2
(45) Date of Patent: *Jan. 27, 2015

(54) TEXT OPERATIONS IN A BITMAP-BASED DOCUMENT

(75) Inventor: Roey Horns, Seattle, WA (US)

(73) Assignee: Adobe Systems Incorporated, San Jose, CA (US)

(*) Notice: Subject to any disclaimer, the term of this patent is extended or adjusted under 35 U.S.C. 154(b) by 308 days.

This patent is subject to a terminal disclaimer.

(21) Appl. No.: 12/957,337

(22) Filed: Nov. 30, 2010

(65) Prior Publication Data

US 2013/0125038 A1 May 16, 2013

Related U.S. Application Data

(63) Continuation-in-part of application No. 12/472,916, filed on May 27, 2009.

(51) Int. Cl.
*G06F 3/048* (2013.01)
*G06F 17/24* (2006.01)
*G06F 17/26* (2006.01)

(52) U.S. Cl.
CPC .............. *G06F 17/24* (2013.01); *G06F 17/26* (2013.01)
USPC .......................................... 715/780; 715/711

(58) Field of Classification Search
USPC .................... 715/705, 711, 723, 728, 780
See application file for complete search history.

(56) References Cited

U.S. PATENT DOCUMENTS

| | | | |
|---|---|---|---|
| 5,040,142 A | 8/1991 | Mori et al. | |
| 5,892,900 A | 4/1999 | Ginter et al. | |
| 5,995,940 A | 11/1999 | Ramaley | |
| 6,243,722 B1 | 6/2001 | Day et al. | |
| 6,789,109 B2 | 9/2004 | Samra et al. | |
| 6,898,601 B2 | 5/2005 | Amado et al. | |
| 7,360,164 B2 | 4/2008 | Bjoernsen et al. | |
| 7,366,979 B2 | 4/2008 | Spielberg et al. | |
| 7,555,557 B2 | 6/2009 | Bradley et al. | |
| 7,559,017 B2 * | 7/2009 | Datar et al. | 715/230 |
| 7,783,154 B2 | 8/2010 | Wilkins et al. | |
| 7,801,392 B2 | 9/2010 | Koyama et al. | |
| 7,822,760 B2 | 10/2010 | Yuen | |
| 7,823,055 B2 | 10/2010 | Sull et al. | |
| 7,831,581 B1 | 11/2010 | Emigh et al. | |
| 7,840,033 B2 | 11/2010 | Kurzweil et al. | |
| 7,840,956 B2 | 11/2010 | Gough et al. | |

(Continued)

OTHER PUBLICATIONS

U.S. Appl. No. 12/395,314, filed Feb. 27, 2009.

(Continued)

*Primary Examiner* — Weilun Lo
*Assistant Examiner* — Truc Chuong
(74) *Attorney, Agent, or Firm* — Wolfe—SBMC

(57) ABSTRACT

Techniques and structures that facilitate text operations in a bitmap-based document are described. In some embodiments, a bitmap image, as well as one or more data structures that may include text code data and text coordinate data, may be generated from an original document. Text coordinate data may relate a location of the text code data to a location in the bitmap image. In some embodiments, a bitmap representation of text and one or more data structures, that may include a set of coordinates of the bitmap representation of text and text code data corresponding to the set of coordinates and the bitmap image may be received. Text operations may be performed on the bitmap representation of text.

20 Claims, 9 Drawing Sheets

(56) References Cited

U.S. PATENT DOCUMENTS

| | | | |
|---|---|---|---|
| 2001/0030667 A1* | 10/2001 | Kelts | 345/854 |
| 2003/0023755 A1 | 1/2003 | Harris et al. | |
| 2003/0182177 A1 | 9/2003 | Gallagher et al. | |
| 2003/0185448 A1* | 10/2003 | Seeger et al. | 382/229 |
| 2004/0001649 A1 | 1/2004 | Simmons | |
| 2004/0085354 A1 | 5/2004 | Massand | |
| 2004/0172450 A1 | 9/2004 | Edelstein et al. | |
| 2004/0237032 A1 | 11/2004 | Miele et al. | |
| 2005/0155070 A1 | 7/2005 | Slaughter | |
| 2005/0185930 A1 | 8/2005 | Jung et al. | |
| 2005/0249374 A1 | 11/2005 | Levy | |
| 2006/0069605 A1 | 3/2006 | Hatoun | |
| 2006/0173803 A1 | 8/2006 | Morris | |
| 2007/0073776 A1 | 3/2007 | Kalalian et al. | |
| 2008/0077866 A1 | 3/2008 | Margulis | |
| 2008/0098432 A1 | 4/2008 | Hardacker et al. | |
| 2008/0155615 A1 | 6/2008 | Craner et al. | |
| 2008/0177782 A1 | 7/2008 | Poston et al. | |
| 2008/0235597 A1 | 9/2008 | Schlesinger et al. | |
| 2009/0076843 A1 | 3/2009 | Graff et al. | |
| 2009/0097815 A1 | 4/2009 | Lahr et al. | |
| 2009/0164985 A1 | 6/2009 | Balko et al. | |
| 2009/0319885 A1 | 12/2009 | Amento et al. | |
| 2010/0138756 A1 | 6/2010 | Saund et al. | |
| 2010/0293027 A1 | 11/2010 | Du Fosse | |
| 2013/0124978 A1 | 5/2013 | Horns | |

OTHER PUBLICATIONS

U.S. Appl. No. 12/395,390, filed Feb. 27, 2009.
Dr. Woohoo, "Photoshop panels: Integrating your ExtendScripts," http://www.adobe.com/devnet/photoshop/articles/integrating_extendscripts.html, Dec. 22, 2008, 4 pages.
U.S. Appl. No. 12/472,916, filed May 27, 2009.
http://en.wikipedia.org/wiki/Image_map, Image map, last modified on May 22, 2009, printed on May 27, 2009, 2 pages.
U.S. Appl. No. 12/395,197, filed Feb. 27, 2009.
"Adding and Hiding Comments in Word 2007", Dummies.com, downloaded via the Waybackmachine, Dec. 8, 2007-May 15, 2008, 2 pages.
"Adobe Reader 8", Copyright© 2006 Adobe Systems Incorporated, (2006), 142 pages.
"Commenting and Markup Tools Overview", retrieved from <http://help.adobe.com/en_US/Reader/8.0/help.html?_content=WSA_13C481_B-BOA-41_d5-ADDF-3C669541_CA35.html>, (Jul. 2006), 2 pages.
"Final Office Action", U.S. Appl. No. 12/472,916, (Mar. 16, 2012), 12 pages.
"Final Office Action", U.S. Appl. No. 12/472,916, (Jun. 8, 2012), 12 pages.
"How to Use Microsoft Word's Commenting Features", retrieved from <http://www.cwrf.utexas.edu/node/56>, (1998), 6 pages.
"Non-Final Office Action", U.S. Appl. No. 12/472,916, (Sep. 7, 2011), 10 pages.
"Quick Tip: Resize Any Textbox or Textarea in Firefox", *The How-To-Geek*, (Jun. 25, 2007), 1 page.
"Track Changes and Comments in Microsoft Word", *University of North Carolina Writing Center course handout*, www.unc.edu/depts/wcweb_1998-2007, retrieved from <http://www.unc.edu/depts/wcweb/handouts/comments.html> on May 19, 2009, 4 pages.
"U.S. Application as Filed", U.S. Appl. No. 12/130,895, (May 30, 2008), 34 pages.
"U.S. Application as Filed", U.S. Appl. No. 12/361,343, (Jan. 28, 2009), 39 pages.
Johnson, Steve "Microsoft Office Word 2007 on Demand", retrieved from <http://academic.safaribooksonline.com/print?xmlid=0789736446/ch141ev1sec2> on Aug. 18, 2011, (Feb. 13, 2007), 20 pages.
White, Ron "How Computers Work", *QUE*, 7th edition, (Oct. 2003), 136 pages.
"Notice of Allowance", U.S. Appl. No. 12/472,916, Oct. 7, 2014, 15 pages.

* cited by examiner

TEXT OPERATIONS IN A BITMAP-BASED DOCUMENT

PRIORITY INFORMATION

This application is a continuation-in-part of U.S. application Ser. No. 12/472,916 entitled "Text Image Review Process" filed May 27, 2009, the content of which is incorporated by reference herein in its entirety.

BACKGROUND

1. Technical Field

This disclosure relates generally to text operations, and more specifically, to text operations on images.

2. Description of the Related Art

In various digital content applications, content, which can include text, graphics, or other content, may be converted into one or more high-fidelity bitmap images. Instead of storing actual text data (ASCII or Unicode and formatting information), a bitmap document file (e.g., PNG, GIF, etc.) stores a bitmap representation of text. By presenting digital content in this manner, the content is reduced to a series of pixels. Any text that existed in the original content is no longer manipulable (e.g., searchable, copyable, or editable).

While a viewer of the content may appreciate the increased fidelity of the content when presented as a bitmap image, the lack of manipulable text may limit a viewer's ability to interact with the underlying text.

SUMMARY

This disclosure describes techniques and structures that facilitate text operations in a bitmap-based document. In one embodiment, an original document, that may include manipulable text code data, may be received. A representation of the original document may be generated. In one embodiment, the generated representation may include a bitmap image of the original document, a data structure that may include text code data, and a data structure that may include text coordinate data. The text coordinate data may include a set of coordinates that relate a location of the text code data to a location in the bitmap image.

In one embodiment, a bitmap file that may include a bitmap representation of text, and one or more data structures, that may include a set of coordinates of the bitmap representation text, and that may include text code data corresponding to the set of coordinates and to the bitmap representation of text, may be received. A text operation input to the bitmap file may also be received. In one embodiment, receiving a text operation input may include specifying a string of text of the bitmap representation of text. In one embodiment, an operation may be performed on the text operation input. Performing the operation may include mapping the specified string of text to the corresponding text code data and to the set of coordinates.

Figure 1:
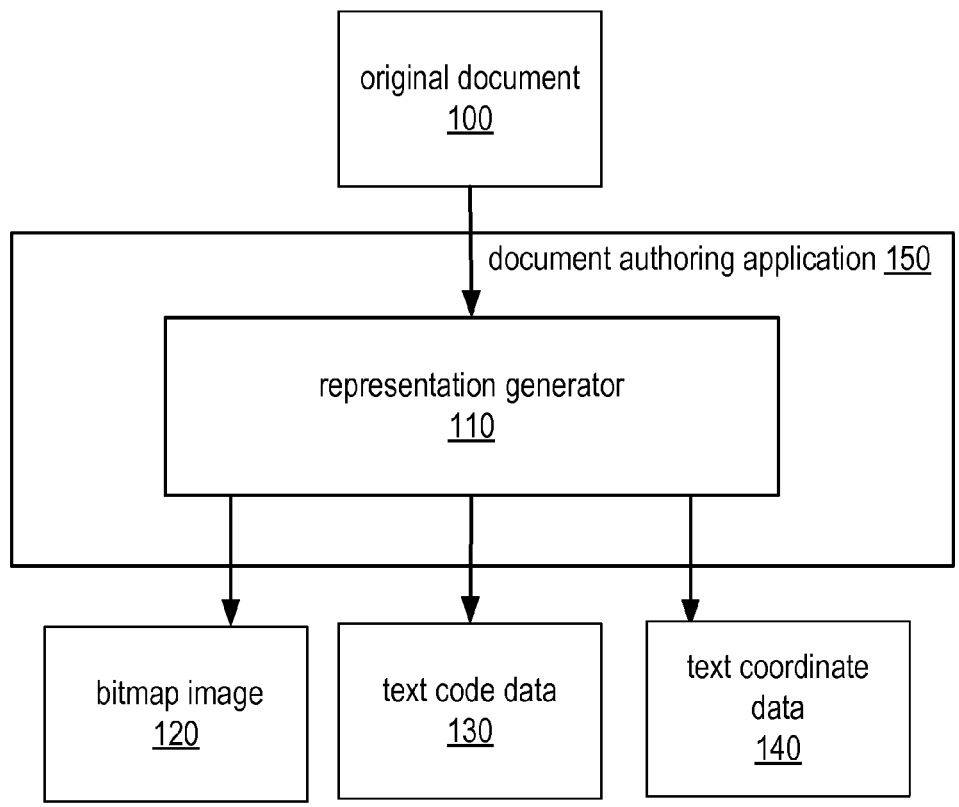
FIG. 1 illustrates an example module that may implement a document authoring method, according to some embodiments.

While the disclosure is described herein by way of example for several embodiments and illustrative drawings, those skilled in the art will recognize that the disclosure is not limited to the embodiments or drawings described. It should be understood, that the drawings and detailed description thereto are not intended to limit the disclosure to the particular form disclosed, but on the contrary, the intention is to cover all modifications, equivalents and alternatives falling within the spirit and scope of the present disclosure. The headings used herein are for organizational purposes only and are not meant to be used to limit the scope of the description. As used throughout this application, the word "may" is used in a permissive sense (i.e., meaning having the potential to), rather than the mandatory sense (i.e., meaning must). Similarly, the words "include", "including", and "includes" mean including, but not limited to.

DETAILED DESCRIPTION OF EMBODIMENTS

In the following detailed description, numerous specific details are set forth to provide a thorough understanding of claimed subject matter. However, it will be understood by those skilled in the art that claimed subject matter may be practiced without these specific details. In other instances, methods, apparatuses or systems that would be known by one of ordinary skill have not been described in detail so as not to obscure claimed subject matter.

Some portions of the detailed description which follow are presented in terms of algorithms or symbolic representations of operations on binary digital signals stored within a memory of a specific apparatus or special purpose computing device or platform. In the context of this particular specification, the term specific apparatus or the like includes a general purpose computer once it is programmed to perform particular functions pursuant to instructions from program software. Algorithmic descriptions or symbolic representations are examples of techniques used by those of ordinary skill in the signal processing or related arts to convey the substance of their work to others skilled in the art. An algorithm is here, and is generally, considered to be a self-consistent sequence of operations or similar signal processing leading to a desired result. In this context, operations or processing involve physical manipulation of physical quantities. Typically, although not necessarily, such quantities may take the form of electrical or magnetic signals capable of being stored, transferred, combined, compared or otherwise manipulated. It has proven convenient at times, principally for reasons of common usage, to refer to such signals as bits, data, values, elements, symbols, characters, terms, numbers, numerals or the like. It should be understood, however, that all of these or similar terms are to be associated with appropriate physical quantities and are merely convenient labels. Unless specifically stated otherwise, as apparent from the following discussion, it is appreciated that throughout this specification discussions utilizing terms such as "processing," "computing," "calculating," "determining" or the like refer to actions or processes of a specific apparatus, such as a special purpose computer or a similar special purpose electronic computing device. In the context of this specification, therefore, a special purpose computer or a similar special purpose electronic computing device is capable of manipulating or transforming signals, typically represented as physical electronic or magnetic quantities within memories, registers, or other information storage devices, transmission devices, or display devices of the special purpose computer or similar special purpose electronic computing device.

Various embodiments of a system and methods for authoring a document and for manipulating a bitmap representation of text are disclosed. In embodiments, a document authoring application may receive an original document that may include manipulable text code data. The document authoring application may generate a representation of the original document that may include a bitmap representation (image) of the original document, a data structure that may include text code data (e.g., ASCII, Unicode, text formatting information), and a data structure that may include text coordinate data. In embodiments, a viewer application may receive a bitmap file that may include a bitmap representation of text, and one or more data structures that may include text code data and text coordinate data. In various embodiments, the viewer application may allow a user to search for or copy text of the bitmap representation by mapping the manipulations to the text code data and text coordinate data. In one embodiment, the viewer application may allow a user to edit text of the bitmap representation by mapping the edits to the text code data and back to the original document.

Some embodiments may include a means for authoring a document and/or a means for viewing a document. For example, a document authoring module may receive as input an original document and may generate a bitmap representation of text and graphics of the original document and one or more data structures containing text code data and text coordinate data. The document authoring module may in some embodiments be implemented by a non-transitory, computer-readable storage medium and one or more processors (e.g., CPUs and/or GPUs) of a computing apparatus. The computer-readable storage medium may store program instructions executable by the one or more processors to cause the computing apparatus to perform receiving an input original document and generate a non-manipulable bitmap representation of text and graphics of the original document and one or more data structures containing text code data and text coordinate data, as described herein. Other embodiments of the document authoring module may be at least partially implemented by hardware circuitry and/or firmware stored, for example, in a non-volatile memory.

As another example, a viewer application module may receive a bitmap file that may include a bitmap representation of text, and one or more data structures that may include text code data and text coordinate data. The view application module may allow a user to search, copy, or edit text of the bitmap representation of the original document by mapping the manipulations to the text code data and text coordinate data and in some embodiments, back to the original document. The viewer application module may in some embodiments be implemented by a non-transitory, computer-readable storage medium and one or more processors (e.g., CPUs and/or GPUs) of a computing apparatus. The computer-readable storage medium may store program instructions executable by the one or more processors to cause the computing apparatus to perform receiving an input bitmap file and data structures and allow a user to search, copy, or edit text of the bitmap representation of an original document, as described herein. Other embodiments of the viewer application module may be at least partially implemented by hardware circuitry and/or firmware stored, for example, in a non-volatile memory.

Turning now to FIG. 1, document authoring application 150 and representation generator 110 may receive an original document 100 and may generate bitmap image 120, text code data 130, and text coordinate data 140. Original document 100 may be any document that may contain text (e.g., ASCII, Unicode), text styling information (e.g., font, size, formatting information), graphics, or other content. Original document 100 may be editable through a word processing program or other program.

Representation generator 110 of document authoring application 150 may receive original document 100 and produce one or more files that may include bitmap image 120, text code data 130, and text coordinate data 140. In some embodiments, bitmap image 120, text code data 130, and text coordinate data 140 may be three separate files.

In one embodiment, bitmap image 120 may be a bitmap file, such as a JPEG or PNG file. It may have the same or similar appearance as original document 100. Bitmap image 120 may be non-manipulable in the sense that a user may not directly make changes to text elements. In effect, the text in bitmap image 120 may simply be an array of pixels. In one embodiment, bitmap image 120 may not contain manipulable text but may have the illusion of manipulable text.

In one embodiment, text code data 130 may exist in a separate file from bitmap image 120 and text coordinate data 140. In one embodiment, text code data 130 and text coordinate data 140 may exist in a single file. In another embodiment, text code data 130 may be in a header or metadata of bitmap image 120. In one embodiment, text code data 130 may exist in a markup language document, such as an extensible markup language (XML) or HyperText Markup Language (HTML) file. Text code data 130 may include actual text elements (e.g., ASCII, Unicode) and may also include text styling information, (e.g., font, size, formatting information). Text code data 130 may include a character index number for each text element/glyph. The character index number may correspond to a character index number in text coordinate data 140 and in original document 100. In one embodiment, text code data 130 may be organized sequentially by character index number or by glyph. In one embodiment, text code data 130 may include cases where two separate characters are displayed as a single glyph (e.g., ligatures, fractions, etc.). For example, 1/2 may be represented as ½. Ligatures are defined herein as two or more characters joined together as a single glyph (e.g., fi). In one embodiment, the width of the two separate glyphs of a ligature may be split in half Width data of a glyph may be included as part of text coordinate data 140. As in the example of fi, text code data 130 may include separate f and i glyphs and may be represented in text coordinate data 140 with a half width f and half width i.

In one embodiment, a situation may exist where the application that creates original document 100 may insert extra glyphs that do not have a corresponding character in text code data 130. For example, extra glyphs may include an artificially inserted hyphen, bullets or numbers of lists, or foreign writing scripts. Likewise, the extra glyph may be present in bitmap image 120 as well. As an example of an artificial hyphen, a hyphen may be inserted by a word processing application in the middle of a word that comes at the end of a line of text. In one embodiment, the extra glyph may not exist in text code data 130. For true (hard) hyphens, though, text code data 130 may include a separate glyph and character index number for the hyphen. Resolving an artificially inserted hyphen or other extra glyph may allow for a text string within text code data 130 to be searched or copied to a clipboard, as if the inserted hyphen or extra glyph does not exist.

In one embodiment, text coordinate data 140 may include information regarding a glyph's width, location (coordinates), and orientation. Text coordinate data 140 may specify where in a display text elements are located, the direction and order in which text flows, and which portions of text belong together. One way to correlate a glyph in original document 100 to one or more text codes is by including a character index number as part of text coordinate data 140. The character index may correspond to a character index in text code data 130 and in original document 100. In one embodiment, the character index may be a sequential number of glyphs in a document. Text coordinate data 140 may exist in the header or metadata of bitmap image 120, in the same file as text code data 130, or in a separate file. In one embodiment, text coordinate data 140 may store information regarding ligatures by halving the width of each character that composes the ligature. In one embodiment, where a hyphen has been artificially inserted, text coordinate data 140 may include a repeat of the character index number of a previous character at the location where the hyphen was artificially inserted. In that manner, an artificially inserted hyphen may be ignored.

Figure 9:
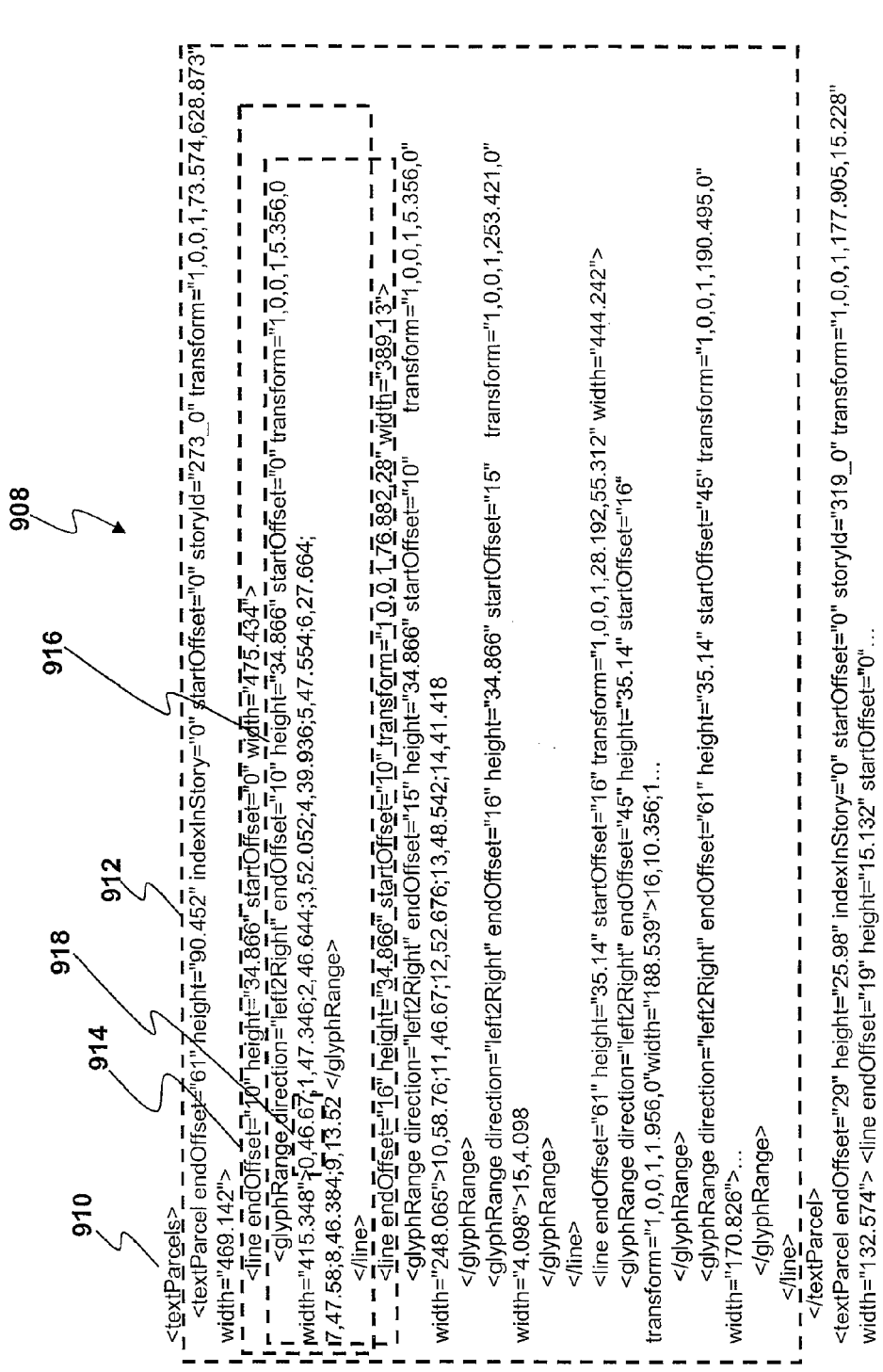
FIG. 9 illustrates one embodiment of text coordinate data in a markup code language document.

In one embodiment, text coordinate data 140 may exist in a markup language code document. FIG. 9 is an example of one embodiment of text coordinate data 140 in a markup language code document. For example, markup language code 908 may comprise a portion of an XML document. In one embodiment, markup language code 908 may specify where, in a display, text elements are located, which direction and/or order that such text flows, and/or which portions of text belong together. Markup language code 908, as shown in FIG. 9, may include a hierarchy of elements, such as textParcel elements 910, parcel elements 912, line elements 914, and glyphRange elements 916. TextParcel elements 910 may include a list of text fragments (or parcels) that may be part of text flows. As used herein, a parcel may be defined as a contiguous area containing text. A parcel element 912 may have properties that denote text fragment width and height, an optional matrix-based transform to position, scale, and/or rotate a text fragment within coordinate space defined by markup language code 908. A parcel element 912 may also have properties that identify which text flow parcel element 912 is associated with and its position in the particular text flow.

In one embodiment, textParcel element 910 may include one or more line elements 914 that may individually include width and height properties and/or a matrix-based transform to position, scale and/or rotate text flow within coordinate space defined by textParcel element 910. Line element 914 may include one or more glyphRange elements 916 that may individually include width and height properties and/or a matrix-based transform to position, scale, and/or rotate text flow within coordinate space defined by line element 914. glyphRange element 916 may include a direction property that allows an application to support text scripts, such as Arabic, for example, which may read from right to left. Individual glyphRange elements may include a list of number pairs 918 separated by a semicolon. An individual number pair 918 may describe a character glyph, width, and/or index within a text flow.

In one embodiment, markup language code 908 may be used to search, copy, or edit text in bitmap image 120. For example, if a user selects text using a mouse by clicking on a start point, dragging the mouse, and releasing the mouse button over an end point, the system disclosed herein may determine which character glyphs to use as start and end points. Other examples are described herein.

In one embodiment, using a markup language code document to represent text included in a bitmapped image document may allow users working with a diversity of client devices with varying processing abilities and platforms to select particular portions of such text without a need for a text editing application. Such an editing application, for example, may be relatively large and cumbersome to use with a thin client.

In one embodiment, markup language code representing text included in a bitmap image document may be maintained and/or transmitted separately from the bitmap image document. Such an implementation may provide an advantage including an ability to preserve information regarding text and/or an image document if either one is modified. For example, one or more users may make edits or other visual content modification that may be represented by metadata represented by markup language code, such as that shown in FIG. 9, for example. In this fashion, visual content provided by a server may be modified by a user at a client device, though such modifications and/or comments need not modify the visual content that is maintained by the server. Instead, such modifications and/or comments performed at a client device may be represented by metadata, which may comprise markup language code, for example, communicated to a server.

Storing non-manipulable image data 120, text code data 130, and text coordinate data 140 as separate files may also provide quicker response for a viewer application reading the information. Quicker response time may be useful for systems that are not as fast or that do not have as much memory, such as a mobile device. Additionally, by creating the one or more files representing original document 100, a user may enjoy a high fidelity rendering of the content of original document 100 yet still have indirect access to the content.

Figure 2:
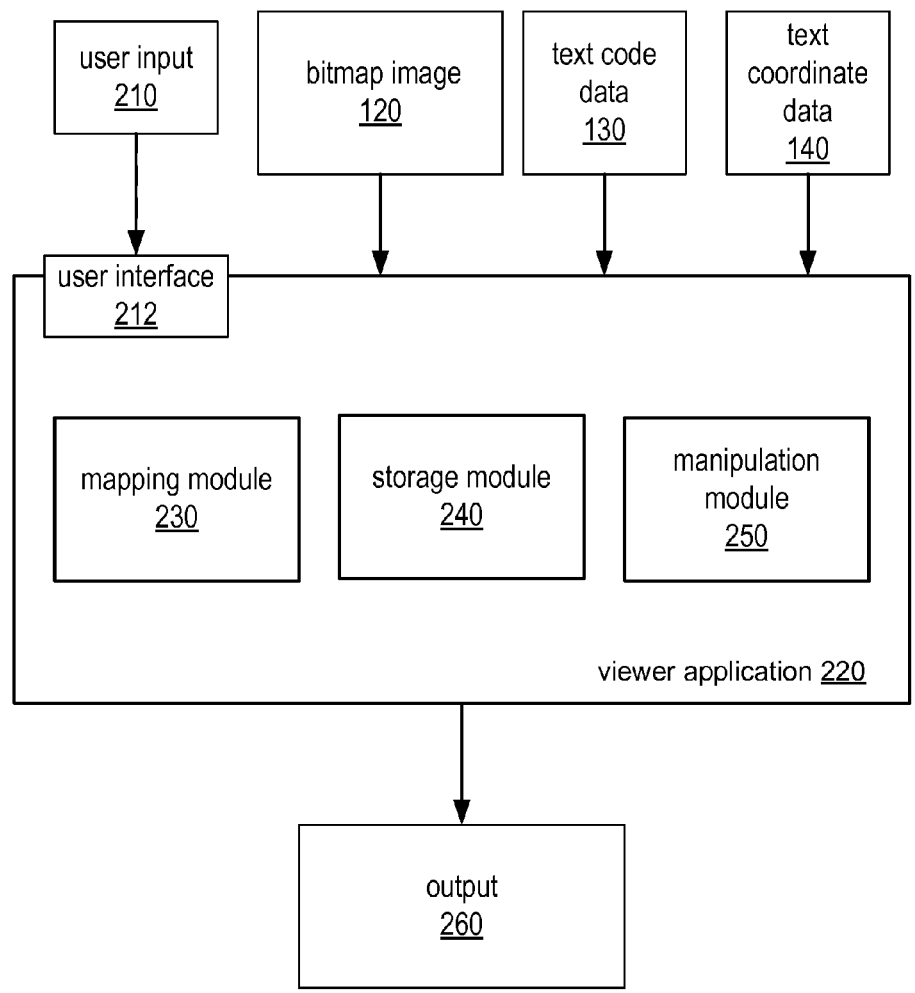
FIG. 2 illustrates an example module that may implement a viewer application, according to some embodiments.

Turning now to FIG. 2, viewer application 220 may receive user input 210 (via user interface 212), bitmap image 120, text code data 130, and text coordinate data 140. Viewer application 220 may produce a variety of outputs 260. For example, in one embodiment, viewer application 220 may search for instances of a text string in text code data 130, map the instances using text coordinate data 140 and display the results on bitmap image 120. In one embodiment, viewer application 220 may allow a user to select a portion of text, map the coordinates of the selection to text code data 130 and copy the selected text string to a system clipboard. In one embodiment, viewer application 220 may allow a user to make edits to text code data 130 and map the changes back to original document 100.

Viewer application 220 may receive user input 210 via user interface 212. User interface 212 may include a keyboard, touch screen device, microphone, or pointing device (e.g., mouse, trackball, stylus, or other similar devices). In one embodiment, user input 210 may include a text operation input, such as typing a string of text on a keyboard or selecting a portion of text by moving a cursor over a portion of text of bitmap image 120 (clicking and dragging). User input 210 may include other inputs that permit operations such as search, copy, paste, or edit.

Bitmap image 120, text code data 130, and text coordinate data 140 received by viewer application 220 may be similar structures to those discussed above, created by document authoring application 150. For example, in one embodiment, bitmap image 120 may be a PNG file, text code data 130 may be a markup language code file, and text coordinate data 140 may be a separate markup language code file.

In one embodiment, viewer application 220 may include three modules that collectively, or individually, may allow a user to perform searching, copying, and/or editing. Viewer application 220 may include mapping module 230, storage module 240, and manipulation module 250.

Mapping module 230 may provide a mapping between bitmap image 120, text code data 130, and text coordinate data 140, and in some embodiments, back to original document 100. Text code data 130, text coordinate data 140, and original document 100 may include character index numbers for each glyph in a sequence that may facilitate mapping from one file to the other. Consider first a scenario where a user types a string of text on a keyboard to search for instances of that string of text. In one embodiment, mapping module 230 may translate each glyph of the string of text into its corresponding character index number. By searching text code data 130 for the glyphs and matching character index numbers. For example, let the input string be "jet". Mapping module 230 may search text code data 130 and find corresponding character index numbers for letters "j", "e", "t" to be 3, 4, 5 and 712, 713, and 714. Mapping module 230 may then search text coordinate data 140 for character index numbers 3, 4, 5, and 712, 713, and 714. The coordinates of each matching string may then be known by viewer application 220. In some embodiments, viewer application 220 may highlight portions of bitmap image 120 that correspond to the search matches. In some embodiments, mapping module 230 or another component of viewer application may map the results of the search back to original document 100, either to coordinates or to the actual text code data (e.g., ASCII, Unicode) of original document 100. In some embodiments, such as when a user wishes to copy a portion of text to paste into another document, the selected string of text may be stored in storage module 240.

In one embodiment, a user may make a selection of text by indicating the selection on bitmap image 120. A user may use a mouse, touch screen, or stylus to select a starting point and ending point of the desired text. Mapping module 230 may then map the coordinates of the selected text to the actual text. In one embodiment, mapping module 230 may receive the coordinates of the user's selection. Mapping module 230 may then search text coordinate data 140 hierarchically until it finds matching coordinates to the selected text coordinates. As in the previous example, the matching coordinates of text coordinate data 140 may include character index numbers. Mapping module 230 may map the character index numbers of the matching coordinates to corresponding character index numbers in text code data 130, and as a result, corresponding text elements. At that point, the actual selected text elements may be known and stored to storage module 240, or copied to a system clipboard.

In one embodiment, a portion of the entered text or selected text may include a ligature character, such as æ. As discussed above, æ may be represented in text code data 130 and text coordinate data 140 with two separate glyphs, a and e, with the glyph widths being one half the typical width of a and e glyphs. Accordingly, mapping module 230 may map a ligature in a manner that is not a true 1:1 correspondence. In a search case, mapping module 230 may, in one embodiment, treat a ligature as two separate glyphs, each with a different character index. That way, the searched sequence may match the way ligatures are treated in text code data 130 and text coordinate data 140. In a select text scenario (click and drag), the halved widths of the two separate characters in text coordinate data 140 may allow a ligature to properly be selected and mapped to text code data 130.

In one embodiment, a word processor may insert an artificial hyphen in the middle of a word. For example, artificial hyphens may be inserted at the end of a line of text with a word continuing in the next line of text. If a user wishes to search for that word of text in the rest of a document, each instance likely does not include an artificial hyphen in the same location. Text coordinate data 140 may account for artificial hyphens by repeating a previous character at the same location when artificial hyphens are present in a text string. Thus, when mapping module 230 maps coordinates to text coordinate data 140 and ultimately to text code data 130, the hyphen may be left out and the searched or copied text string may be the word, without the hyphen.

In one embodiment, viewer application 220 may include storage module 240. Storage module 240 may cause selected text elements to be stored (i.e., copied to clipboard). For example, if a user wants to select a portion of text and copy it to paste into another window or application, storage module 240 may cause the selected portion of text to be stored and available to paste. Storage module 240 may also cause edits to data files, such as text code data 130, to be saved and be available to map back to the original document 100.

In one embodiment, viewer application 220 may include manipulation module 250. Manipulation module 250 may enable a user to make edits to text elements. In one embodiment, a user may select a portion of text by clicking and dragging an area of bitmap image 120. As described herein, the coordinates of the selected portion may be mapped to corresponding coordinates in text coordinate data 140. The corresponding coordinates in text coordinate data 140 may be translated to character index numbers which may be mapped to corresponding character index numbers and text elements in text code data 130. The user may choose to edit (e.g., delete or add text) the selected portion of text. In some embodiments, a pop-up window may display an editable copy of the selected text and allow a user to make edits with feedback. Manipulation module 250 may allow the user to edit the text elements of text code data 130, which may result in different character index numbers in text code data 130. In one embodiment, manipulation module 250, along with mapping module 230, may cause the edits to be mapped back to original document 100, when available. The edits to text code data 130 may be saved and in some embodiments, may then be associated with original document 100.

A viewer application such as the one described in FIG. 2 may enable a user to perform text operations indirectly on a bitmap image while also providing a high fidelity rendering of an original document. A high fidelity rendering may be useful in applications such as digital magazines, digital periodicals, digital books, or other applications containing text. In some embodiments, viewer application 220 may be a browser plug-in such that a stand alone program to author and manipulate such documents may not be necessary.

Figure 3:
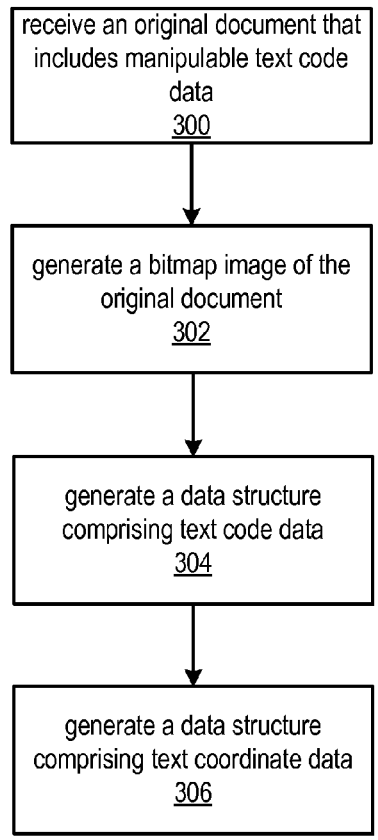
FIG. 3 is a flowchart of a document authoring method, according to some embodiments.
Figure 4:
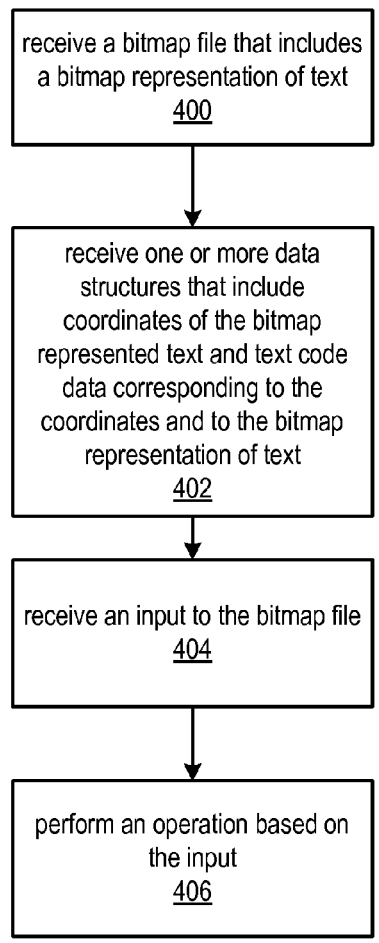
FIG. 4 is a flowchart of a method for performing a text operation in a bitmap image, according to some embodiments.

FIGS. 3 and 4 illustrate example methods, in some embodiments, of a document authoring application and a viewer application, respectively.

FIG. 3 illustrates one embodiment of a method of a document authoring application. While the blocks are shown in a particular order for ease of understanding, other orders may be used. In one embodiment, documenting authoring application 150 may perform the method of FIG. 3. In some embodiments, the method of FIG. 3 may include additional (or fewer) blocks than shown.

At 300, document authoring application 150 may receive an original document 100 that includes manipulable text. The original document, also known as a source document, may include text, graphics, and other content. The original document may be a typical word processing document that is fully editable.

At 302, document authoring application 150 may generate a bitmap image 120 of the original document. Bitmap image 120 may be any form of a bitmap image, such as a JPEG or PNG file. It may have the same or similar appearance as original document 100. Bitmap image 120 may be non-manipulable in the sense that a user may not make changes to the bitmap representation of text, for example. In effect, the text in bitmap image 120 may simply be an array of pixels.

At 304, document authoring application 150 may generate a data structure that may include text code data 130. Text code data 130 may include text elements (ASCII, Unicode). In one embodiment, text code data 130 may include text styling information as well. Text code data 130 may include character index numbers that may correspond to character index numbers in original document 100 and text coordinate data 140. Text code data 130 may be stored in a markup language document, such as XML, and may be stored in a separate file or the same file as text coordinate data 140 and/or bitmap image 120.

At 306, document authoring application 150 may generate a data structure that may include text coordinate data 140. Text coordinate data 140 may include text display coordinates to position and orient text elements, text lines, and text flows. Text coordinate data 140 may also include character index data and glyph widths. Text coordinate data 140 may be stored in a markup language document, which may the same markup language document that stores text code data 130. In one embodiment, text coordinate data 140 is in a separate file.

FIG. 4 illustrates one embodiment of a method of performing a text operation in a bitmap image. In one embodiment, viewer application 220 may perform the method of FIG. 4. While the blocks are shown in a particular order for ease of understanding, other orders may be used. In some embodiments, the method of FIG. 4 may include additional (or fewer) blocks than shown.

At 400, viewer application 220 may receive a bitmap file that includes a non-manipulable bitmap representation of text, such as bitmap image 120.

At 402, viewer application 220 may receive one or more data structures that include coordinates of the bitmap represented text and text code data corresponding to the coordinates. In addition, viewer application 220 may, in one embodiment, receive orientation information, character width, and character index numbers of the bitmap represented text. Text code data may include character index numbers, text elements, and in some embodiments, styling information. In one embodiment, the one or more data structures may be in a header or metadata of the bitmap file of block 400.

At 404, viewer application 220 may receive an input to the bitmap file. The input may come from a pointing device, such as a mouse, a keyboard, stylus, joystick, touch screen, microphone (voice-to-text) or other type of input device. The input may include a text string, a selected portion of text, or an indication of deletion of a character (such as a backspace or delete key press).

At 406, viewer application 220 may, in response to the input in block 404, perform an operation. Operations may include searching for instances of a text string (see FIG. 5), copying a selected portion of text (see FIG. 6), editing a portion of text (see FIG. 7), or combinations thereof. To perform an operation, viewer application 220 may map selected portions of text, or text strings, to the received data structures and to the received bitmap file and possibly to a source document. Mapping may allow a user to indirectly perform text operations on a bitmap image.

Figure 5:
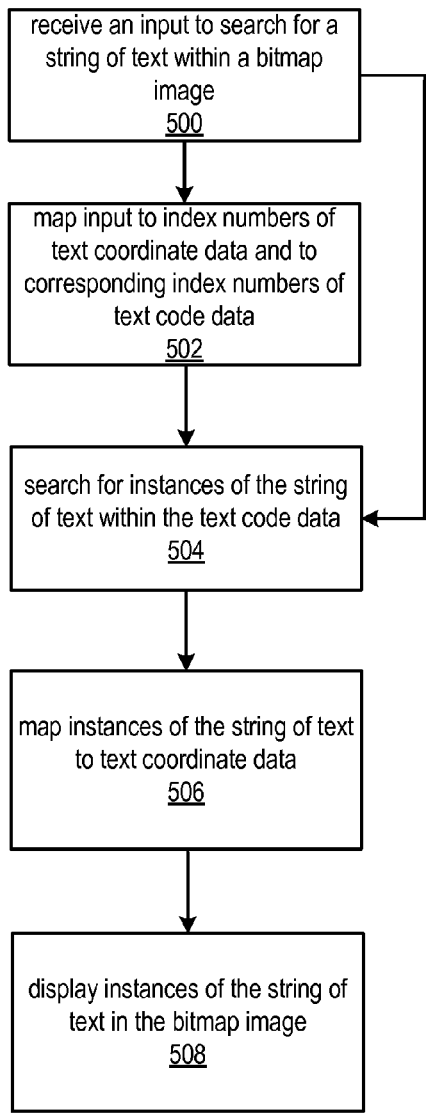
FIG. 5 is a flowchart of a method for searching for text in a bitmap image, according to some embodiments.
Figure 6:
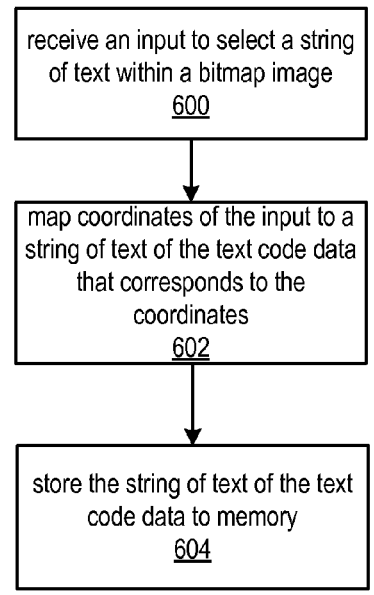
FIG. 6 is a flowchart of a method for copying text from a bitmap image, according to some embodiments.
Figure 7:
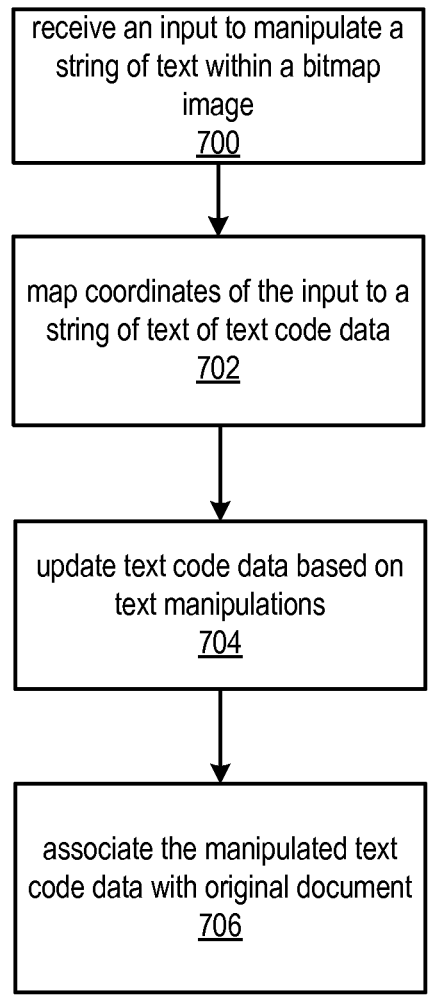
FIG. 7 is a flowchart of a method for editing text in a bitmap image, according to some embodiments.

FIGS. 5-7 illustrate some examples of text operations that viewer application 220, for example, may be capable of performing.

FIG. 5 illustrates one embodiment of a method of searching for text in a bitmap image. In one embodiment, viewer application 220 may perform the method of FIG. 5. While the blocks are shown in a particular order for ease of understanding, other orders may be used. In some embodiments, the method of FIG. 5 may include additional (or fewer) blocks than shown.

At 500, viewer application 220 may receive an input to search for a string of text within bitmap image 120. In one embodiment, the input may include a selection of a portion of text, such as a user clicking and dragging a portion of text with a mouse, stylus, or finger. In another embodiment, the input may include a string of text, for example, entered by a user with a keyboard or virtual keyboard. In the latter embodiment, the actual string of text being searched for may be known by viewer application 220 and an initial mapping to coordinates of text coordinate data 140 may not be necessary. As a result, if the received input is in the form of a text string, block 502 may not be necessary either.

At 502, viewer application 220 may map coordinates of the selected portion of text to coordinates of text coordinate data 140. Viewer application 220 may then determine which glyphs and character index numbers correspond to the selected portion text. In one embodiment, viewer application 220 may determine which glyphs to use as the starting and end points. Such a determination may be made, for example, by first searching for the text parcel that the mouse pointer points to by comparing the mouse pointer's current coordinates with the width, height, and/or transform properties of text parcels in text coordinate data 140 until a particular text parcel is found that encloses the mouse pointer's current location. A similar search may be performed for line elements contained within the text parcel. Again, a similar search may be performed for glyph ranges with each glyph until the search finds a character glyph whose bounding box encloses the current mouse pointer coordinates. At the point the coordinates of the selected text have been associated with corresponding characters in text coordinate data 140, the character index numbers of those characters in text coordinate data 140 may be mapped to corresponding character index numbers in text code data 130.

As an example, consider a scenario where a user intends to search for the word "test" in a bitmap image. Viewer application 220 may compute the coordinates of the selected text within text coordinate data 140. Viewer application 220 may then determine which glyphs in text coordinate data 140 are encompassed by the selected area. The selected glyphs of text coordinate data 140 may include a character index number for each glyph, for example, 12-15. The character index numbers 12-15 may then be mapped to character index numbers 12-15 in text code data 130 to determine which glyphs correspond to those character index numbers. In one embodiment, text code data 130 may include a set of character index numbers and their corresponding glyphs. In the present example, the mapping may indicate that character index numbers 12-15 in text code data 130 correspond to the glyphs "t", "e", "s", "t".

At 504, viewer application 220 may search for instances of the string of text within text code data 130. The search may be performed by an algorithm. The search algorithm may include sequential comparison, grep (global regular expression print), or any other algorithm suitable to perform searches. The search algorithm may return instances of the text string within text code data 130 and the corresponding character index numbers. Taking the previous example where the mapping from text coordinate data 140 to text code data 130 indicated that the text string was "shipping," (or if the user directly typed in the string "shipping" and a mapping may not have been necessary) the search algorithm may search for instances of the string "shipping" within text code data 130. For example, the search algorithm may return instances of test at character index numbers 12-15, 886-889, and 1101-1104.

At 506, viewer application 220 may map the instances of the string of text back to text coordinate data 140. Mapping the instances of the string of text back to text coordinate data 140 may include mapping character index numbers for the instances of the text string to character index numbers in text coordinate data 140. Text coordinate data 140 may then associate the character index numbers with coordinate and orientation information. Continuing the previous example, text coordinate data 140 may receive the character index numbers 12-15, 886-889, and 1101-1104. Text parcels of text coordinate data 140 may be searched hierarchically, as described above, to compute the coordinates and orientation of the instances of "test."

At 508, viewer application 220 may display instances of the string of text in the bitmap image. For example, viewer application 220 may highlight the instances of the string of text by drawing a number of quadrangles, or other shapes, covering the computed coordinates and orientation.

Figure 10:
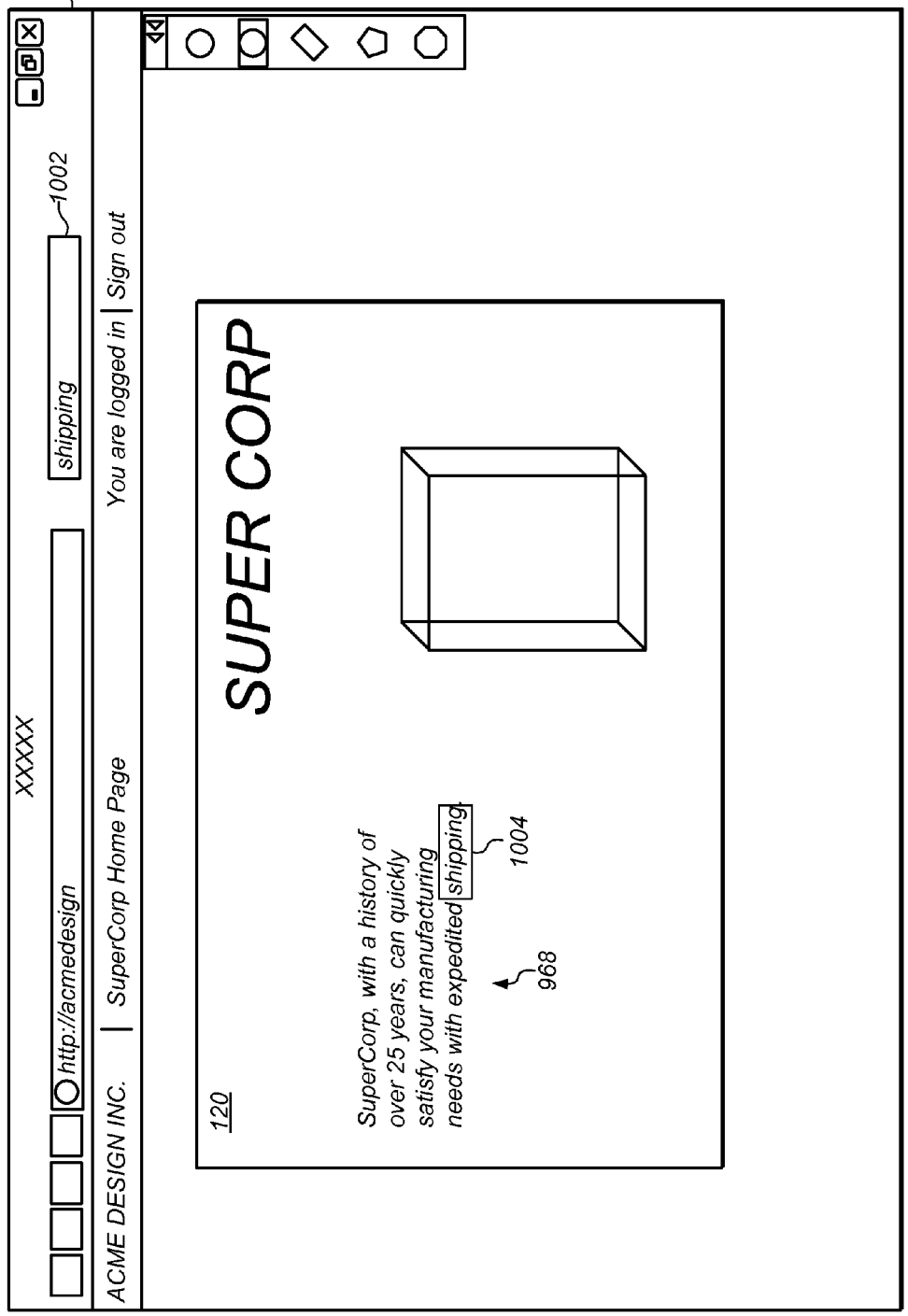
FIGS. 10-11 illustrate examples of one embodiment of a user display.

FIG. 10 illustrates an example of a user display application of the method of FIG. 5 where a user may search for text within bitmap image 120 of display 200.

Display 200 may include search input box 1002. As described herein, a user may enter a string to search for in search input box 1002 or may select a portion of text of bitmap image 120, for example with a pointing device. As shown in FIG. 10, a user may enter "shipping" as the term that will be searched for, as indicated in search input box 1002. Viewer application may return the instances of the word "shipping" within text 968 of bitmap image 120. The instance(s) may be illustrated as indication 1004 in display 200. The indication 1004 may be in the form of highlighting, underlining, bolding, or any other form.

FIG. 6 illustrates one embodiment of a method of copying text from a bitmap image. While the blocks are shown in a particular order for ease of understanding, other orders may be used. In some embodiments, the method of FIG. 6 may include additional (or fewer) blocks than shown.

At 600, viewer application 220 may receive an input to select a string of text within bitmap image 120. In one embodiment, the input may include a selection of a portion of text, such as a user clicking and dragging a portion of text with a mouse or a user touching and dragging a finger or stylus on a touch screen device. Selection of a portion of text may be performed in other manners as well.

At 602, viewer application 220 may map the coordinates of the user selection to a corresponding string of text of text code data 130. In one embodiment, viewer application 220 may determine which glyphs to use as the starting and end point. Such a determination may be made by first searching for the text parcel that the mouse pointer, finger, or stylus points to by comparing the mouse pointer's current coordinates with the width, height, and/or transform properties of text parcels in text coordinate data 140 until such a particular text parcel is found that encloses the mouse pointer's current location. A similar search may be performed for line elements contained within the text parcel. Again, a similar search may be performed for glyph ranges with each glyph until such a search finds a character glyph whose bounding box encloses the current mouse pointer coordinates. At the point the coordinates of the selected text are associated with corresponding characters in text coordinate data 140, the character index numbers of those characters in text coordinate data 140 may be mapped to corresponding character index numbers in text code data 130. In one embodiment, the corresponding character index numbers in text code data 130 include associated text elements. The associated text elements may comprise the selected string of text.

As an example, consider a scenario where a user intends to copy the word "test" from a bitmap image. Viewer application 220 may search within text coordinate data 140 for the coordinates of the selected text, as given by the selecting device (e.g., mouse, stylus, finger, keyboard, etc.). Viewer application 220 may then determine which glyphs in text coordinate data 140 are encompassed by the selected area. The selected glyphs of text coordinate data 140 may include a character index number for each glyph, for example, 12, 13, 14, and 15. The character index numbers 12-15 may then be mapped to character index numbers in text code data 130 to determine what glyphs correspond to those character index numbers and, as a result, the selected text. Text code data 130 may include a set of character index numbers and their corresponding glyphs. In the present example, the mapping may indicate that character index numbers 12-15 in text code data 130 correspond to the glyphs "t", "e", "s", "t". Thus, in this example, the selected string of text is "test".

At 604, viewer application 220 may store the string of text of text code data 130 to memory. For example, viewer application 220 may store the associated text elements of text code data 130, "test" in the previous example, to a system clipboard. In other embodiments, the associated text elements may be provided for storage elsewhere, for example, to a memory module.

FIG. 7 illustrates one embodiment of a method of editing text in a bitmap image. While the blocks are shown in a particular order for ease of understanding, other orders may be used. In some embodiments, the method of FIG. 7 may include additional (or fewer) blocks than shown.

At 700, viewer application 220 may receive an input to manipulate a string of text within bitmap image 120. The input may include adding text, deleting text, changing a text style, or a combination thereof. In addition to the text manipulations themselves, the input may include selecting a location of the bitmap to manipulate. For example, in one embodiment, a user may select a portion of text to edit with a pointing device.

At 702, viewer application 220 may map coordinates of the input to a string of text of text code data 130. Blocks 700 and 702 may be performed simultaneously or as part of a single block. In one embodiment, viewer application 220 may provide a pop-up window containing a copy of the selected text. The user may then make edits in the pop-up window, including additions, deletions, modifications, and text style changes so that the user can see edits as the user makes them.

In one embodiment, the text provided in the pop-up window may be provided in a similar manner to the copy method of FIG. 6. In other words, a user may select a portion of text in bitmap image 120, the coordinates of the selection are mapped to text coordinate data 140 and text code data 130, and the selected string of text identified in text code data 130 may be copied to a clipboard. The selected string of text may then be pasted into the editing pop-up window.

At 704, viewer application 220 may update text code data 130 based on the received text manipulations. Text code data 130 may be updated as the user makes the changes to the selected text, for example, as the user types in a pop-up window. In one embodiment, the pop-up window includes a button for the user to confirm changes before changes may be applied to text code data 130. In one embodiment, changes to text code data 130 may include changes to text elements and to character index numbers. As an example, consider a scenario where a user wishes to change the string "texts" to "test". A user may select a portion of the bitmap encompassing the word "texts" and a window may appear containing an editable version of the word "texts". A user may delete the "s" and change (i.e., delete and add) "x" to "s" and select a confirm button. Text code data 130 may then be updated to reflect the change. If the character index numbers were 30-34 for the string "texts" then an updated text code data 134 may include character index numbers 30-33 for the updated string "test". The text element that previously corresponded to character index number 35 may be updated to 34. Other subsequent text elements of text code data 130 may have their corresponding character index numbers adjusted as well. In other embodiments, character index numbers for non-edited text elements may remain the same.

At 706, viewer application 220 may, in some embodiments, associate the manipulated text code data 130 with original document 100, if available. In one embodiment, viewer application may save the manipulated text code data 130. The saved manipulated text code 130 data may be provided to another system, such as a remote user. When original document 100 and manipulated text code data 130 is available, to a user of viewer application 220 or to a remote user, manipulated text code data 130 may be mapped back to original document 100.

Figure 11:
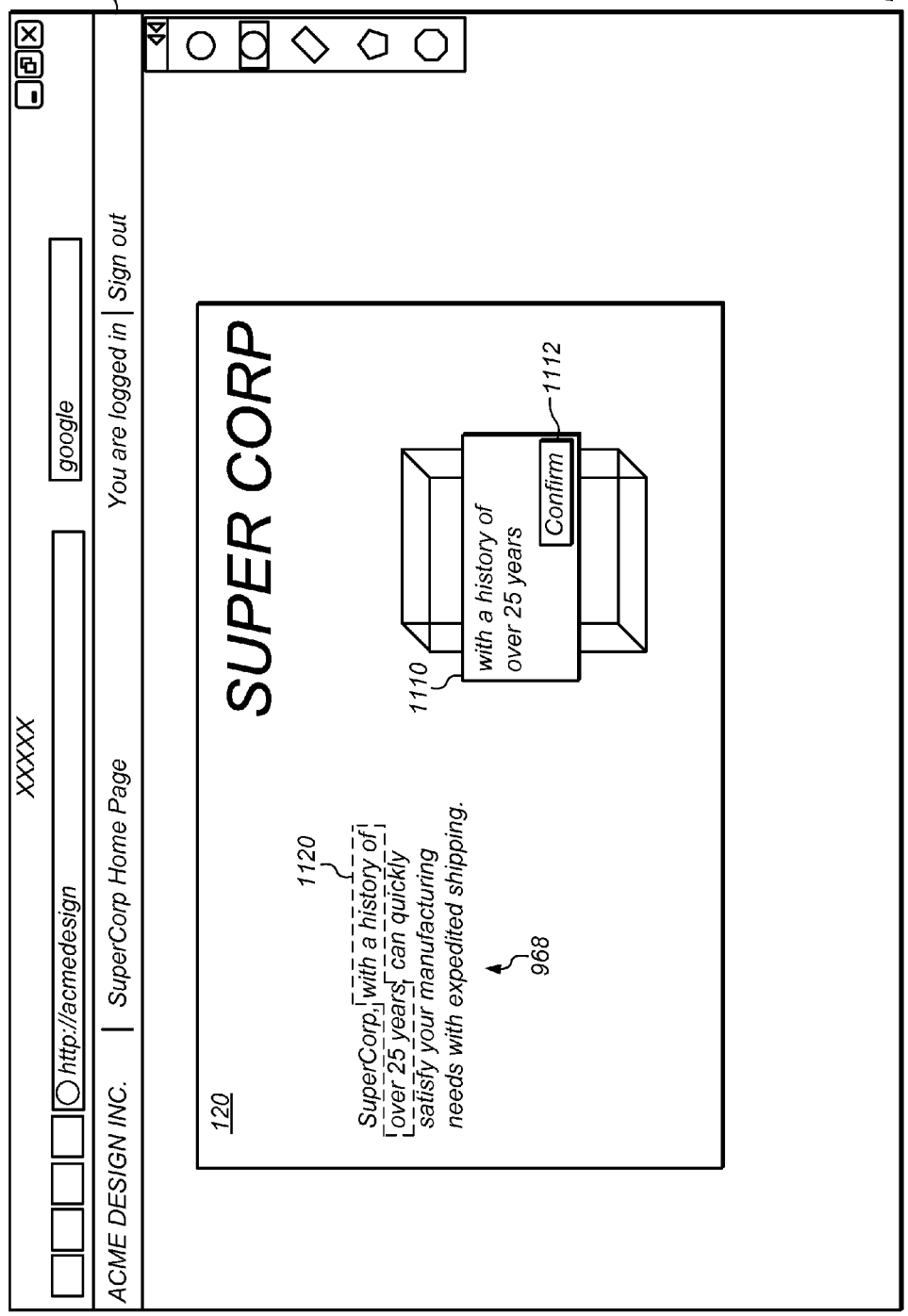

FIG. 11 illustrates an example of a user display application of the method of FIG. 7 where a user may edit text within bitmap image 120 of display 200. As shown in FIG. 11, a user may select a portion of text 1120 of bitmap image 120, for example with a pointing device. Viewer application 220 may generate pop-up window 1110 that may contain a copy of the selected portion of text 1120. A user may edit the text in pop-up window 1110. In one embodiment, a user may select a button 1112 indicating that the user has finished editing the text. At that point, the edits may be saved to text code data 130. In some embodiments, when a user selects a portion of text 1120, a copy of the text from text code data 130 may be copied to a system clipboard, as described in FIG. 6.

The system and methods for document authoring and viewing documents, described herein, may allow a user to indirectly access and manipulate text that otherwise would be non-manipulable. Text may be accessible, whether in a one page, one column text layout, or with different columns and different font sizes that do not necessarily line up. Further, text may be accessed in documents with a noisy background. In some embodiments, text may even be accessed in cases where circular, non-linear text is present. Any of the preceding examples of text configurations (layout, orientation, size) may be present in many types of digital media, including: magazines, books, periodicals, or other applications that may be rendered as a bitmap representation.

Example System

Figure 8:
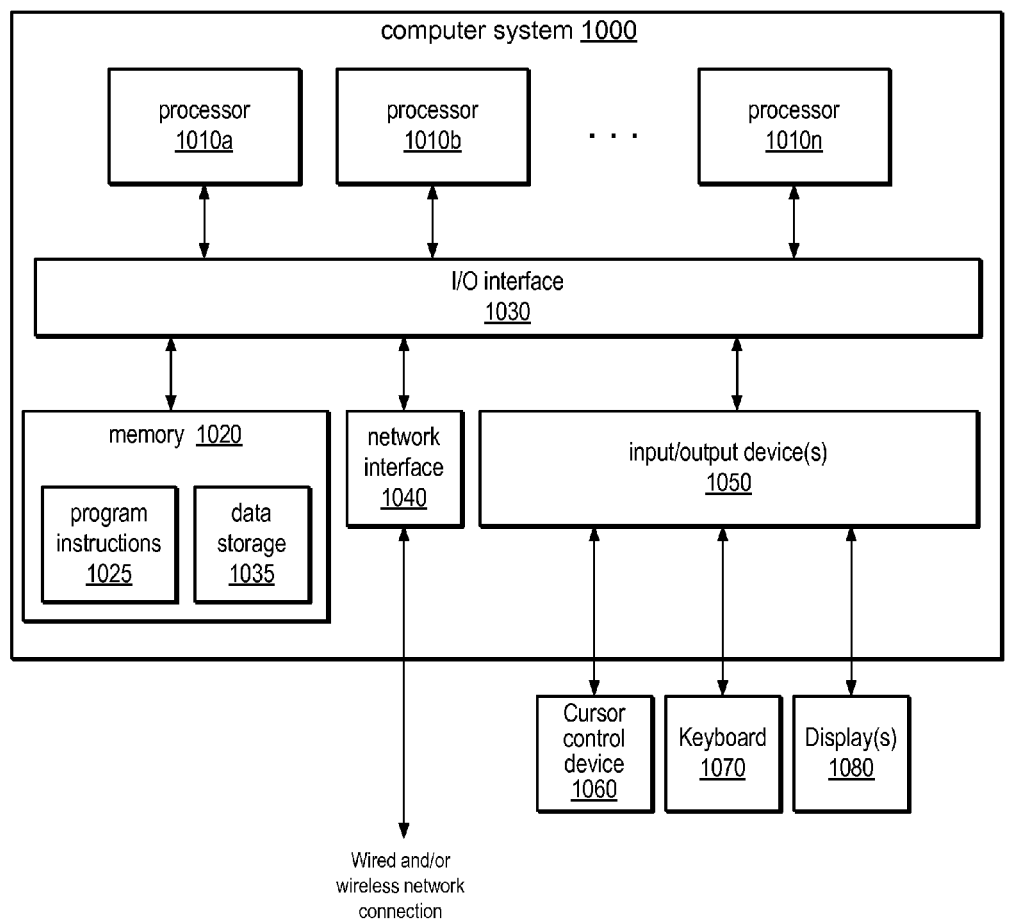
FIG. 8 illustrates an example computer system that may be used in embodiments.

Embodiments of techniques for text operations in a bitmap-based document as described herein may be executed on one or more computer systems, which may interact with various other devices. One such computer system is illustrated by FIG. 8. In different embodiments, computer system 1000 may be any of various types of devices, including, but not limited to, a personal computer system, desktop computer, laptop, notebook, or netbook computer, mainframe computer system, handheld computer, workstation, network computer, a camera, a set top box, a mobile device, a consumer device, video game console, handheld video game device, application server, storage device, a peripheral device such as a switch, modem, router, or in general any type of computing or electronic device.

In the illustrated embodiment, computer system 1000 includes one or more processors 1010 coupled to a system memory 1020 via an input/output (I/O) interface 1030. Computer system 1000 further includes a network interface 1040 coupled to I/O interface 1030, and one or more input/output devices 1050, such as cursor control device 1060, keyboard 1070, and display(s) 1080. In some embodiments, it is contemplated that embodiments may be implemented using a single instance of computer system 1000, while in other embodiments multiple such systems, or multiple nodes making up computer system 1000, may be configured to host different portions or instances of embodiments. For example, in one embodiment some elements may be implemented via one or more nodes of computer system 1000 that are distinct from those nodes implementing other elements.

In various embodiments, computer system 1000 may be a uniprocessor system including one processor 1010, or a multiprocessor system including several processors 1010 (e.g., two, four, eight, or another suitable number). Processors 1010 may be any suitable processor capable of executing instructions. For example, in various embodiments, processors 1010 may be general-purpose or embedded processors implementing any of a variety of instruction set architectures (ISAs), such as the x86, PowerPC, SPARC, or MIPS ISAs, or any other suitable ISA. In multiprocessor systems, each of processors 1010 may commonly, but not necessarily, implement the same ISA.

In some embodiments, at least one processor 1010 may be a graphics processing unit. A graphics processing unit or GPU may be considered a dedicated graphics-rendering device for a personal computer, workstation, game console or other computing or electronic device. Modern GPUs may be very efficient at manipulating and displaying computer graphics, and their highly parallel structure may make them more effective than typical CPUs for a range of complex graphical algorithms. For example, a graphics processor may implement a number of graphics primitive operations in a way that makes executing them much faster than drawing directly to the screen with a host central processing unit (CPU). In various embodiments, the image processing methods disclosed herein may, at least in part, be implemented by program instructions configured for execution on one of, or parallel execution on two or more of, such GPUs. The GPU(s) may implement one or more application programmer interfaces (APIs) that permit programmers to invoke the functionality of the GPU(s). Suitable GPUs may be commercially available from vendors such as NVIDIA Corporation, ATI Technologies (AMD), and others.

System memory 1020 may be configured to store program instructions and/or data accessible by processor 1010. In various embodiments, system memory 1020 may be implemented using any suitable memory technology, such as static random access memory (SRAM), synchronous dynamic RAM (SDRAM), nonvolatile/Flash-type memory, or any other type of memory. In the illustrated embodiment, program instructions and data implementing desired functions, such as those described above for are shown stored within system memory 1020 as program instructions 1025 and data storage 1035, respectively. In other embodiments, program instructions and/or data may be received, sent or stored upon different types of computer-accessible media or on similar media separate from system memory 1020 or computer system 1000. Generally speaking, a computer-accessible medium may include storage media or memory media such as magnetic or optical media, e.g., disk or CD/DVD-ROM coupled to computer system 1000 via I/O interface 1030. Program instructions and data stored via a computer-accessible medium may be transmitted by transmission media or signals such as electrical, electromagnetic, or digital signals, which may be conveyed via a communication medium such as a network and/or a wireless link, such as may be implemented via network interface 1040.

In one embodiment, I/O interface 1030 may be configured to coordinate I/O traffic between processor 1010, system memory 1020, and any peripheral devices in the device, including network interface 1040 or other peripheral interfaces, such as input/output devices 1050. In some embodiments, I/O interface 1030 may perform any necessary protocol, timing or other data transformations to convert data signals from one component (e.g., system memory 1020) into a format suitable for use by another component (e.g., processor 1010). In some embodiments, I/O interface 1030 may include support for devices attached through various types of peripheral buses, such as a variant of the Peripheral Component Interconnect (PCI) bus standard or the Universal Serial Bus (USB) standard, for example. In some embodiments, the function of I/O interface 1030 may be split into two or more separate components, such as a north bridge and a south bridge, for example. In addition, in some embodiments some or all of the functionality of I/O interface 1030, such as an interface to system memory 1020, may be incorporated directly into processor 1010.

Network interface 1040 may be configured to allow data to be exchanged between computer system 1000 and other devices attached to a network, such as other computer systems, or between nodes of computer system 1000. In various embodiments, network interface 1040 may support communication via wired or wireless general data networks, such as any suitable type of Ethernet network, for example; via telecommunications/telephony networks such as analog voice networks or digital fiber communications networks; via storage area networks such as Fibre Channel SANs, or via any other suitable type of network and/or protocol.

Input/output devices 1050 may, in some embodiments, include one or more display terminals, keyboards, keypads, touchpads, scanning devices, voice or optical recognition devices, or any other devices suitable for entering or retrieving data by one or more computer system 1000. Multiple input/output devices 1050 may be present in computer system 1000 or may be distributed on various nodes of computer system 1000. In some embodiments, similar input/output devices may be separate from computer system 1000 and may interact with one or more nodes of computer system 1000 through a wired or wireless connection, such as over network interface 1040.

Memory 1020 may include program instructions 1025, configured to implement embodiments of text operations on a bitmapped-based document as described herein, and data storage 1035, comprising various data accessible by program instructions 1025. In one embodiment, program instructions 1025 may include software elements of embodiments illustrated in the above Figures. Data storage 1035 may include data that may be used in embodiments. In other embodiments, other or different software elements and data may be included.

Those skilled in the art will appreciate that computer system 1000 is merely illustrative and is not intended to limit the scope of text operations in a bitmap-based document as described herein. In particular, the computer system and devices may include any combination of hardware or software that can perform the indicated functions, including a computer, personal computer system, desktop computer, laptop, notebook, or netbook computer, mainframe computer system, handheld computer, workstation, network computer, a camera, a set top box, a mobile device, network device, internet appliance, PDA, wireless phones, pagers, a consumer device, video game console, handheld video game device, application server, storage device, a peripheral device such as a switch, modem, router, or in general any type of computing or electronic device. Computer system 1000 may also be connected to other devices that are not illustrated, or instead may operate as a stand-alone system. In addition, the functionality provided by the illustrated components may in some embodiments be combined in fewer components or distributed in additional components. Similarly, in some embodiments, the functionality of some of the illustrated components may not be provided and/or other additional functionality may be available.

Those skilled in the art will also appreciate that, while various items are illustrated as being stored in memory or on storage while being used, these items or portions of them may be transferred between memory and other storage devices for purposes of memory management and data integrity. Alternatively, in other embodiments some or all of the software components may execute in memory on another device and communicate with the illustrated computer system via inter-computer communication. Some or all of the system components or data structures may also be stored (e.g., as instructions or structured data) on a computer-accessible medium or a portable article to be read by an appropriate drive, various examples of which are described above. In some embodiments, instructions stored on a computer-accessible medium separate from computer system 1000 may be transmitted to computer system 1000 via transmission media or signals such as electrical, electromagnetic, or digital signals, conveyed via a communication medium such as a network and/or a wireless link. Various embodiments may further include receiving, sending or storing instructions and/or data implemented in accordance with the foregoing description upon a computer-accessible medium. Accordingly, the present disclosure may be practiced with other computer system configurations.

Conclusion

Various embodiments may further include receiving, sending or storing instructions and/or data implemented in accordance with the foregoing description upon a computer-accessible medium. Generally speaking, a computer-accessible medium may include storage media or memory media such as magnetic or optical media, e.g., disk or DVD/CD-ROM, volatile or non-volatile media such as RAM (e.g. SDRAM, DDR, RDRAM, SRAM, etc.), ROM, etc., as well as transmission media or signals such as electrical, electromagnetic, or digital signals, conveyed via a communication medium such as network and/or a wireless link.

The various methods as illustrated in the Figures and described herein represent example embodiments of methods. The methods may be implemented in software, hardware, or a combination thereof. The order of method may be changed, and various elements may be added, reordered, combined, omitted, modified, etc.

Various modifications and changes may be made as would be obvious to a person skilled in the art having the benefit of this disclosure. It is intended that the disclosure embrace all such modifications and changes and, accordingly, the above description to be regarded in an illustrative rather than a restrictive sense.

What is claimed is:

1. A method, comprising:
receiving a bitmap file that includes a bitmap representation of text;
receiving one or more data structures that include a set of coordinates of the bitmap representation of text, and text code data corresponding to the set of coordinates and to the bitmap representation of text, the bitmap file and the one or more data structures each generated by a document authoring application, from an original document that includes manipulable text code data;
receiving a text operation input to the bitmap file, the text operation input includes specifying a string of text of the bitmap representation of text;
performing an operation based on the text operation input, the operation including mapping the specified string of text to the corresponding text code data and to the set of coordinates; and
mapping the text operation input to the bitmap file back to the original document based on said performing the operation that is based on the text operation input.

2. The method of claim 1, wherein the specifying the string of text includes receiving a signal representative of a cursor movement over a selected portion of text in the bitmap image.

3. The method of claim 1, wherein the mapping the specified string of text to the corresponding text code data includes determining a subset of coordinates of the specified string of text and determining a subset of the text code data that corresponds to the subset of coordinates.

4. The method of claim 1, wherein the performing the operation comprises a search operation including identifying one or more instances of the string of text in the text code data, mapping the one or more instances to the set of coordinates of the bitmap represented text, and displaying an indication of the instances.

5. The method of claim 1, wherein the performing the operation comprises a copy operation including storing to memory the text code data corresponding to the specified string of text of the bitmap representation of text.

6. The method of claim 1, further comprising: performing an edit operation comprising receiving a manipulation of the text code data that is associated with the set of coordinates.

7. The method of claim 1, wherein the text code data includes styling information.

8. A non-transitory computer-readable storage medium comprising stored program instructions that are computer-executable to implement:
receiving a bitmap file that includes a bitmap representation of text;
receiving one or more data structures including a set of coordinates of the bitmap represented text, and text code data corresponding to the set of coordinates and to the bitmap represented text, the bitmap file and the one or more data structures each generated by a document authoring application, from an original document that includes manipulable text code data;
receiving an input to the bitmap file;
performing an operation based on the input, the operation including mapping the input to the corresponding text code data and to the set of coordinates; and
mapping the input to the bitmap file back to the original document based on said performing the operation that is based on the input.

9. The non-transitory computer-readable storage medium of claim 8, wherein the receiving the input includes receiving a signal representative of a cursor movement over a selected region of the bitmap file.

10. The non-transitory computer-readable storage medium of claim 8, wherein the receiving the input includes receiving a string of text.

11. The non-transitory computer-readable storage medium of claim 9, wherein the mapping the input to the corresponding text code data includes determining a subset of coordinates of the bitmap representation of text corresponding to the selected region of the bitmap file, and determining a subset of the text code data that corresponds to the subset of coordinates.

12. The non-transitory computer-readable storage medium of claim 8, wherein the performing the operation comprises a search operation including identifying an instance of the string of text in the text code data, mapping the instance to the set of coordinates of the bitmap represented text, and displaying an indication of the instance.

13. The non-transitory computer-readable storage medium of claim 8, wherein the performing the operation comprises a copy operation including storing to memory the text code data corresponding to the input.

14. The non-transitory computer-readable storage medium of claim 8, further comprising: performing an edit operation comprising receiving a manipulation of the text code data that is associated with the set of coordinates; and saving the manipulated text code to a memory.

15. The non-transitory computer-readable storage medium of claim 8, wherein the text code data includes styling information.

16. A non-transitory computer-readable storage medium comprising stored program instructions that are computer-executable to implement:
receiving an original document that includes manipulable text code data; and
generating a representation of the original document that comprises:
a bitmap image of the original document,
a first data structure comprising text code data that corresponds to a set of coordinates and to the bitmap image, the bitmap image and data structures each generated by a document authoring application, and
a second data structure comprising text coordinate data that includes the set of coordinates that relate a location of the text code data to a location in the bitmap image;
receiving a text operation input to the bitmap image, the text operation input specifying a string of text of the bitmap image;
performing an operation based on the text operation input, the operation including mapping the specified string of text to the corresponding text code data and to the set of coordinates; and
mapping the text operation input to the bitmap image back to the original document based on the text coordinate data.

17. The non-transitory computer-readable storage medium of claim 16, wherein the bitmap image, the first data structure comprising the text code data, and the second data structure comprising the text coordinate data comprises two or more separate files.

18. The non-transitory computer-readable storage medium of claim 16, wherein the text code data includes styling information.

19. The non-transitory computer-readable storage medium of claim 16, wherein the text coordinate data includes a subset of coordinates of each glyph in the bitmap image that correspond to one or more codes in the text code data.

20. The non-transitory computer-readable storage medium of claim 16, wherein the data structure includes markup language code.

* * * * *